United States Patent
Lim et al.

(10) Patent No.: US 8,943,545 B2
(45) Date of Patent: Jan. 27, 2015

(54) DIGITAL LIVING NETWORK ALLIANCE SYSTEM AND METHOD FOR PROVIDING CONTENT THEREIN

(75) Inventors: Byung-Soo Lim, Seongnam-si (KR); Joon-Oo Kim, Suwon-si (KR); Ki-Chul Park, Suwon-si (KR); Sang-Won Ahn, Suwon-si (KR); Tae-Hwan Hwang, Suwon-si (KR); Won-Sang Kwon, Seoul (KR)

(73) Assignee: Samsung Electronics Co., Ltd. (KR)

( * ) Notice: Subject to any disclaimer, the term of this patent is extended or adjusted under 35 U.S.C. 154(b) by 751 days.

(21) Appl. No.: 12/718,456

(22) Filed: Mar. 5, 2010

(65) Prior Publication Data
US 2010/0228758 A1  Sep. 9, 2010

(30) Foreign Application Priority Data

Mar. 5, 2009 (KR) .................. 10-2009-0018908
Sep. 10, 2009 (KR) .................. 10-2009-0085470

(51) Int. Cl.
*H04N 7/16* (2011.01)
*G06F 7/00* (2006.01)
*G06F 17/30* (2006.01)
*H04L 29/06* (2006.01)
(Continued)

(52) U.S. Cl.
CPC ...... *H04L 65/4084* (2013.01); *G06F 17/30817* (2013.01); *G11B 27/034* (2013.01); *G11B 27/105* (2013.01); *G11B 27/329* (2013.01); *G11B 27/34* (2013.01); *H04N 21/43615* (2013.01); *H04N 21/43622* (2013.01)
USPC .......................................... 725/140; 707/758

(58) Field of Classification Search
CPC ...................... G06F 17/30817; H04L 65/4084
USPC ........................................... 725/140; 707/758
See application file for complete search history.

(56) References Cited

U.S. PATENT DOCUMENTS 7,668,933 B2 * 2/2010 Yoshida et al. ............... 709/217
8,245,265 B2 * 8/2012 Yoon et al. .................... 725/140
(Continued)

FOREIGN PATENT DOCUMENTS

JP    2005-268834    9/2005
JP    2008-005254    1/2008
(Continued)

OTHER PUBLICATIONS

"DLNA Overview and Vision Whitepaper", Digital Living Network Alliance, Internet Citation, Jan. 1, 2007.
(Continued)

*Primary Examiner* — Greta Robinson
*Assistant Examiner* — Brian E. Weinrich
(74) *Attorney, Agent, or Firm* — The Farrell Law Firm, P.C.

(57) ABSTRACT

A Digital Living Network Alliance (DLNA) system and method of providing content therein are provided. A legacy media player displays a content list for content stored in the legacy media player or in an add-in server, and when a content item is selected from the list, the legacy media player determines whether the content item is reproducible by a registered digital media renderer. If the selected content item is reproducible by the registered digital media renderer, the legacy media player transmits a reproducing request for the selected content item, and the corresponding digital media renderer receives and reproduces the selected content.

10 Claims, 10 Drawing Sheets

(51) Int. Cl.
    *G11B 27/034*     (2006.01)
    *G11B 27/10*     (2006.01)
    *G11B 27/32*     (2006.01)
    *G11B 27/34*     (2006.01)
    *H04N 21/436*     (2011.01)
    *G06F 15/16*     (2006.01)

(56) References Cited

U.S. PATENT DOCUMENTS

| | | | |
|---|---|---|---|
| 2006/0161635 A1* | 7/2006 | Lamkin et al. | 709/217 |
| 2007/0047909 A1* | 3/2007 | Toyama et al. | 386/95 |
| 2007/0118606 A1* | 5/2007 | Duncan et al. | 709/217 |
| 2007/0168051 A1* | 7/2007 | Bronnenberg et al. | 700/20 |
| 2007/0237090 A1 | 10/2007 | Kim et al. | |
| 2008/0002945 A1* | 1/2008 | Ushimaru et al. | 386/95 |
| 2009/0157892 A1* | 6/2009 | Sekiguchi et al. | 709/231 |
| 2010/0121911 A1 | 5/2010 | Sekiguchi et al. | |
| 2010/0306411 A1* | 12/2010 | Zhang et al. | 709/246 |

FOREIGN PATENT DOCUMENTS

| | | |
|---|---|---|
| KR | 1020070048449 | 5/2007 |
| KR | 100754431 | 8/2007 |
| WO | WO 2005/043408 | 5/2005 |
| WO | WO 2005/079071 | 8/2005 |
| WO | WO 2007/099529 | 9/2007 |
| WO | WO 2008/108002 | 9/2008 |
| WO | WO 2009/034483 | 3/2009 |

OTHER PUBLICATIONS

"DLNA Expands Certification Program to Include "Play To" and "Print To" Functionality", Internet Citation, Dec. 16, 2008.
CES 2009: Philips and Nokia to Boost Interoperability with DLNA, Internet Citation, Jan. 8, 2009.

* cited by examiner

FIG.10

DIGITAL LIVING NETWORK ALLIANCE SYSTEM AND METHOD FOR PROVIDING CONTENT THEREIN

PRIORITY

This application claims priority under 35 U.S.C. §119(a) to a Korean Patent Application filed in the Korean Intellectual Property Office on Mar. 5, 2009 and assigned Serial No. 10-2009-0018908, and to a Korean Patent Application filed in the Korean Intellectual Property Office on Sep. 10, 2009 and assigned Serial No. 10-2009-0085470, the entire disclosures of both of which are incorporated herein by reference.

BACKGROUND OF THE INVENTION

1. Field of the Invention

The present invention relates to a Digital Living Network Alliance (DLNA) system, and a method for providing content therein.

2. Description of the Related Art

Figure 1:
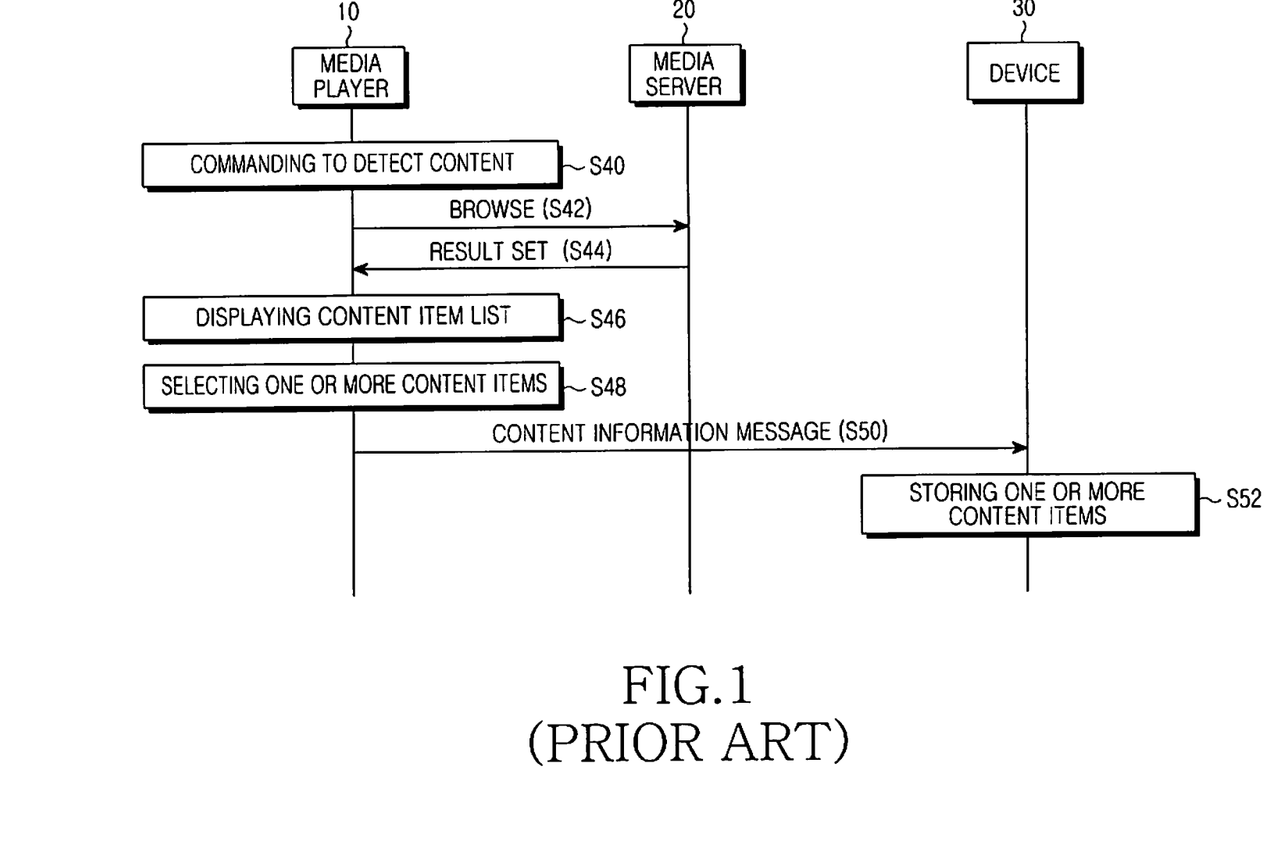
FIG. 1 is a flowchart illustrating a conventional content information sharing method in a DLNA system.

FIG. 1 is a flowchart illustrating a content information sharing method in a conventional DLNA system.

Referring to FIG. 1, a command to detect content stored in a media server 20 is input to a media player 10 from a user in step S40. In step S42, the media player 10 produces a browse message to detect the content stored in the media server 20, and transmits the browse message to the media server 20. Here, the command to detect content may be sent to a single media server, or sent to multiple media servers.

After the browse message is received from the media player 10, the media server 20 creates a content item list result set for all the media formats of contents using a content directory service, and transmits the content item list result set to the media player 10 in step S44. The media player 10 then displays the content item list result set transmitted from the media server 20 in step S46.

If any content items are selected by the user from the displayed content item list in step S48, the media player 10 includes the selected content items in a content information 10 message, and transmits the content information message to a device 30 that is capable of reproducing the selected content items in step S50. The device 30 may be any type of a digital media renderer and/or player.

Although not illustrated in FIG. 1, the media player 10 should previously complete a detection process for the device 30, to ensure that the device 30 is capable of reproducing the content items selected by the user, before the media player 10 transmits the content message information.

After receiving the content information message from the media player 10, the device 30 inspects a protocol field in a classification header field included in the content information message received from the media player 10, and if the protocol field indicates the presence of the selected content items, the device 30 parses the content items included in a data field of the content information message, and stores the content items in step S52.

The media player 10 or the device 30 receives a command to reproduce content in the content items selected by the user, and then reproduces a corresponding content.

The above-described conventional DLNA system and content sharing method have a problem in that if a user performs switching for a content item from the media player 10 to the device 30, the user is required to make multiple input operations to receive a rendering service for the content item, and it is impossible to continuously resume reproduction of the content item. Consequently, the conventional content sharing may be inconvenient for a user to access.

SUMMARY OF THE INVENTION

Accordingly, the present invention has been made to solve at least the above-described problems occurring in the prior art, and the present invention provides a DLNA system and a method of providing content therein, which contemplates user convenience in providing a rendering service.

In addition, the present invention provides a system and method for implementing a resume function for the same media file using different media file reproducing devices in a DLNA system.

In accordance with an aspect of the present invention, there is provided a method for providing content in a Digital Living Network Alliance (DLNA) system including an add-in server and an add-in controller connected to a digital media player. The method includes displaying, through the digital media player, a content list including at least one content item stored in the digital media player or in the add-in server; determining, by the digital media player, whether a content item is reproducible by a registered digital media renderer, when the content item included is selected from the content list; transmitting a reproducing request for the selected content item from the digital media player to the add-in controller, if the selected content item is reproducible by the registered digital media renderer; transmitting a reproducing command for the selected content item from the add-in controller to the add-in server or the registered digital media renderer; and reproducing, by the digital media renderer, the selected content item.

In accordance with another aspect of the present invention, there is provided a Digital Living Network Alliance (DLNA) system. The system includes an add-in server for storing content; a digital media player for displaying a content list including at least one content item stored in the digital media player or in the add-in server, for determining whether a content item is reproducible by a registered digital media renderer, when the content item is selected from the content list, and for transmitting a reproducing request for the selected content item, if the selected content item is reproducible by the registered digital media renderer; an add-in controller for receiving the reproducing request from the digital media player, and for controlling the registered digital media renderer to reproduce the selected content item; and the registered digital renderer receiving the selected content item and for reproducing the selected content item.

In accordance with another aspect of the present invention, there is provided a method of providing a media file by an add-in system in a Digital Living Network Alliance (DLNA) system including a digital media player and at least one digital media renderer connected to the add-in system. The method includes receiving, by the add-in system, a resume request for resuming reproduction of the media file that was initially reproduced in the digital media player in the digital media renderer; receiving, by the add-in system, reproducing information for the media file from the digital media player; and requesting, by the add-in system, the digital media renderer to search for a current reproducing position included in the reproducing information in the media file and reproduce the media file from the current reproducing position.

In accordance with another aspect of the present invention, there is provided a method of providing a media file by a resume supporting system in a Digital Living Network Alliance (DLNA) system, the resume supporting system being connected to a plurality of digital media renderers. The method includes receiving, by the resume supporting system, a resume request for resuming reproduction of the media file that was initially reproduced in a first digital media renderer in a second digital media renderer; receiving, by the resume supporting system, reproducing information for the media file from the first digital media renderer; and requesting, by the resume supporting system, the second digital media renderer to search for a current reproducing position included in the reproducing information in the media file and to reproduce the media file from the current reproducing position.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE INVENTION

Hereinafter, various embodiments of the present invention will be described with reference to the accompanying drawings. In the following description, the same elements will be designated by the same reference numerals although they are shown in different drawings. Further, a detailed description of known functions and configurations incorporated herein will be omitted when it may obscure the subject matter of the present invention.

In addition, for example, the present invention connects the digital media server (e.g., a server computer or a server terminal) and the digital media controller to a digital media player having a file browser function or interacting with a file browser (e.g., windows explorer being a file manager application included in the Microsoft Windows operating system) of a computer in an add-in type. If the digital media server is connected to the digital media player in the add-in type, the digital media player supports and displays virtual containers (i.e., folders or directories) on the networked file system of the digital media server, so that content items on the digital media server can be searched using the digital media player. The add-in type digital media controller interacts with the digital media player and does not work by itself.

In the present invention, content contained in the digital media server is displayed using a digital media player of a computer, a mobile terminal, or the like, and if at least one content item is selected by the user, the digital media controller controls the digital media server, such that the selected content is transmitted to a digital media renderer (hereinafter, referred to as a "renderer"), which is capable of reproducing the selected content. Additionally, the digital media server connected in the add-in type will be referred to as "add-in server," and the digital media controller connected in the add-in type will be referred to as "add-in controller."

Figure 2:
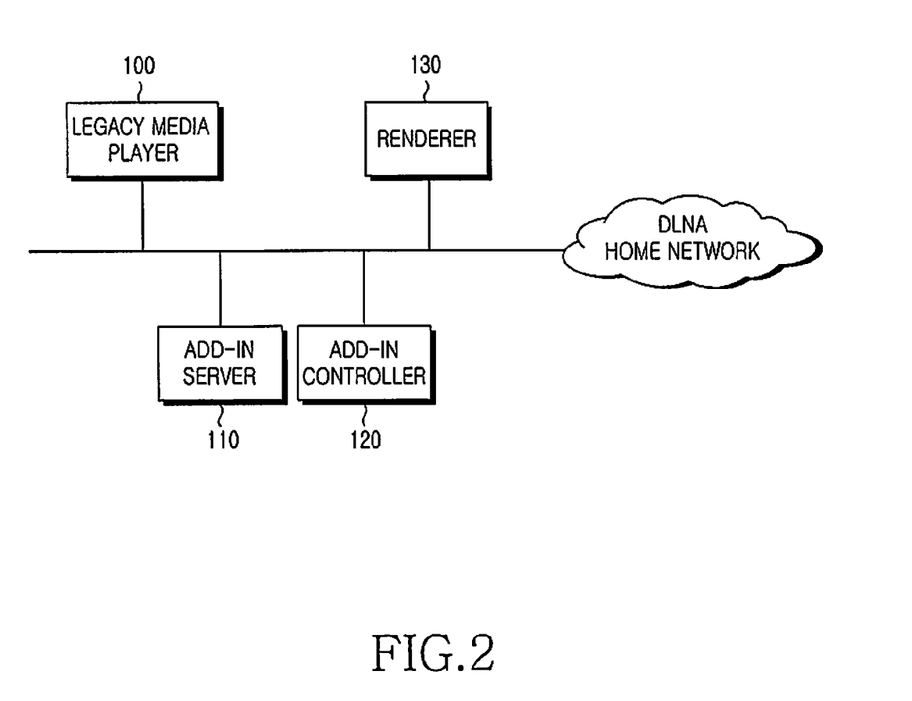
FIG. 2 is a block diagram illustrating a DLNA system according to an embodiment of the present invention.

FIG. 2 is a block diagram illustrating a DLNA system according to an embodiment of the present invention.

Referring to FIG. 2, the DLNA system includes a legacy media player 100 (hereinafter, to be referred to as a "player"), an add-in server 110, an add-in controller 120, and a renderer 130. Although only one renderer 130 is illustrated in FIG. 2, the present invention is also applicable to system including multiple renderers 130. In addition, although not shown in FIG. 2, the DLNA system may also include multiple digital media servers.

The player 100 is connected to the add-in server 110, and displays a list of content stored in the add-in server 110, and content stored in the player 100 (hereinafter, the list will be referred to as "a content list"). For example, the player 100 may have a file browser function, which displays the content list as thumbnails, icons, tiles, or a detailed list.

In addition, if at least one content item is selected from the content list, the player 100 determines whether the selected content is a file capable of being supported by the renderer 130. Because the content list displayed by the player 100 includes the content stored in the player and in the add-in server 110, it is important to find a reproducing device that is capable of reproducing or executing the selected content. Thus, by determining whether the selected content item is a file that is supported by the renderer 130, the player 100 can determine whether the selected content item is a file reproducible by the player 100 or by the renderer 130.

If the selected content is a file capable of being supported by the renderer 130, a reproducing request for the content is transmitted to the add-in controller 120, so that the selected content can be reproduced under the control of the add-in controller 120. However, if the selected content can be reproduced only by the player 100, it is determined that the player 100 reproduces the content.

If the content can be reproduced by either the player 100 or the renderer 130, the player 100 according to an embodiment of the present embodiment provides priority to the renderer 130, such that the renderer 130 can reproduce the content under the control of the add-in controller 120. In another embodiment of the present invention, the player 100 may have priority over the renderer 130, or the user may be prompted to select which device to use for content reproduction.

At least one content item is stored in the add-in server 110. In addition, if a specific content item is reproduced under the control of the add-in controller 120, the add-in server 110 may execute, under the control of the add-in controller 120, coding of the content in a format suitable for the renderer 130, which will reproduce the content. The add-in server 110 transmits the coded content to the renderer 130 under the control of the add-in controller 120.

The add-in controller 120 controls at least one digital media server included in the DLNA system, including the add-in server 110, and controls the renderers, so that contents can be either stored or reproduced. Upon receiving a reproducing request for content supported by at least one renderer from the player 100, the add-in controller 120 according to an embodiment of the present invention determines a renderer 130 that is proper for reproducing of the content. In addition, the add-in controller 120 controls the add-in server 110 including the content to code the content in a format suitable for the renderer 130. If the coded content is transmitted to the renderer 130 from the add-in server 110, the add-in controller 120 transmits a reproducing command to the renderer 130, thereby controlling the renderer 130 to reproduce the content. Under the control of the add-in controller 120, the renderer 130 reproduces the content transmitted from the add-in server 110.

Figure 3:
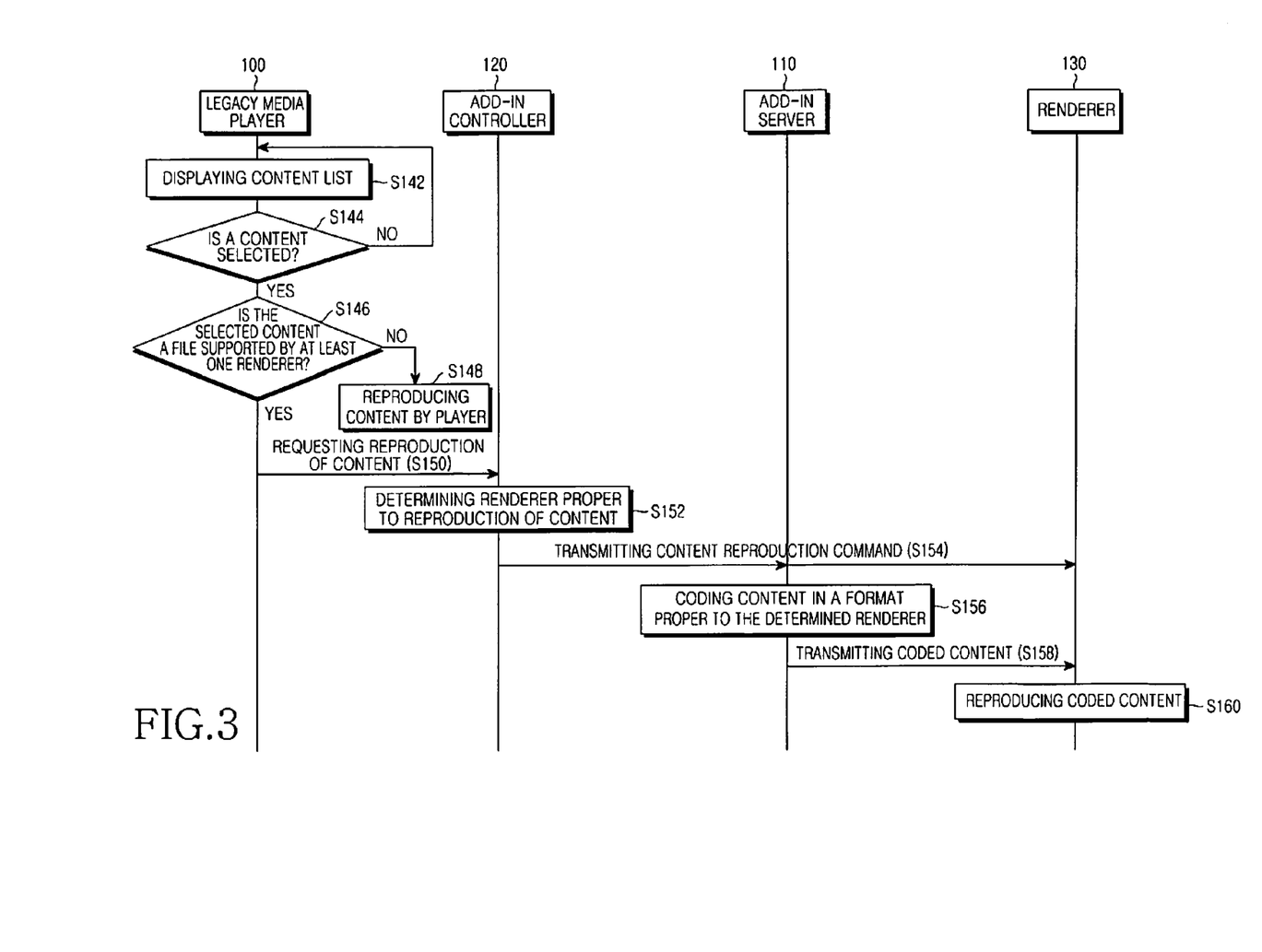
FIG. 3 is a flowchart illustrating a content providing method in a DLNA system according to an embodiment of the present invention.

FIG. 3 is a flowchart illustrating a content providing method in a DLNA system according to an embodiment of the present invention.

Referring to FIG. 3, the player 100 displays a content list in step S142. For example, the player 100 may display the content list through a file browser. In the present embodiment, it is assumed that the player 100 has previously received individual content storing paths for content stored in the add-in server 110. If the player 100 is connected with the add-in server 110, the add-in controller 120 can control the add-in server 110 to transmit the content list for the content stored in the add-in server 110 and information for each content item to the player.

In step S144, the player 100 determines whether a specific content item is selected by a user. If a specific content item is not selected, the player 100 maintains a standby condition, thereby continuously displaying the content list.

However, if a specific content is selected in step S144, the player 100 determines whether the specific content is a file supported by at least one renderer in step S146.

If the specific content item is not a file type supported by the at least one renderer in step S146, the content is reproduced by the player 100 in step S148.

However, if the selected content item is a file type supported by the at least one renderer in step S146, the player sends a request for reproduction of the selected content item to the add-in control 120 in step S150.

Upon receiving the request for reproducing the selected content item from the player 100, the controller 120 determines a renderer 130 that is capable of reproducing of the content in step S152.

After the renderer 130 is determined, the add-in controller 120 transmits a content reproduction command to the add-in server 110 and the selected renderer 130 in step S154. The content reproduction command may be transmitted to the selected renderer 130 via the add-in server 110 in step S154, or transmitted to the selected renderer 130 with coded content by the add-in controller 120 in step S158.

Upon receiving the content reproducing command from the add-in controller 120, the add-in server 110 codes the selected content item in a format suitable for the selected renderer 130 in step S156, and transmits the coded content to the renderer 130 in step S158. In step S160, the renderer 130 receives the coded content from the add-in server 110 and reproduces the content.

Figure 4:
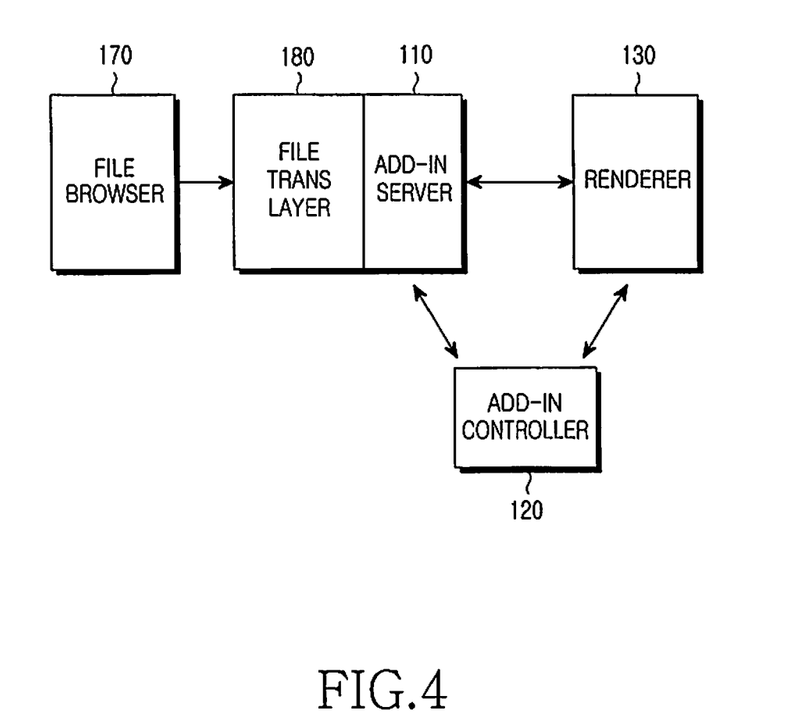
FIG. 4 is a block diagram illustrating a DLNA system according to an embodiment of the present invention.

FIG. 4 is a block diagram illustrating a DLNA system according to another embodiment of the present.

Referring to FIG. 4, the DLNA system includes a file browser 170, a file trans layer 180, an add-in server 110, an add-in controller 120, and a renderer 130.

The file browser 170 is included in a player 100 for displaying a content list for individual content items provided from the player 100 and the add-in server 110. The user may select at least one content item, using the file browser 170.

The file trans layer 180 extracts file paths for individual content items stored in the add-in server 110. If a content item is selected through the file browser 170, the file trans layer 180 can receive content information for the selected content item from the file browser 170. The content information, for example, may include the file name of the selected content item, and the file trans layer 180 may find the storing path of the content item stored in the add-in server 110, using the file name. Thereafter, the add-in controller 120 controls the add-in server 110 to transmit the content item stored in the stored path to the renderer 130, and the renderer 130 reproduces the content item transmitted from the add-in server 110.

The file trans layer 180 may receive a content path from the player 100. The file trans layer 180 controls the add-in server 110 to code the content existing in the content path, and transmits the coded content to the renderer 130. For example, a content storing path may be transmitted to the file trans layer 180 from the player 100 in a typewritten letter format.

Figure 5:
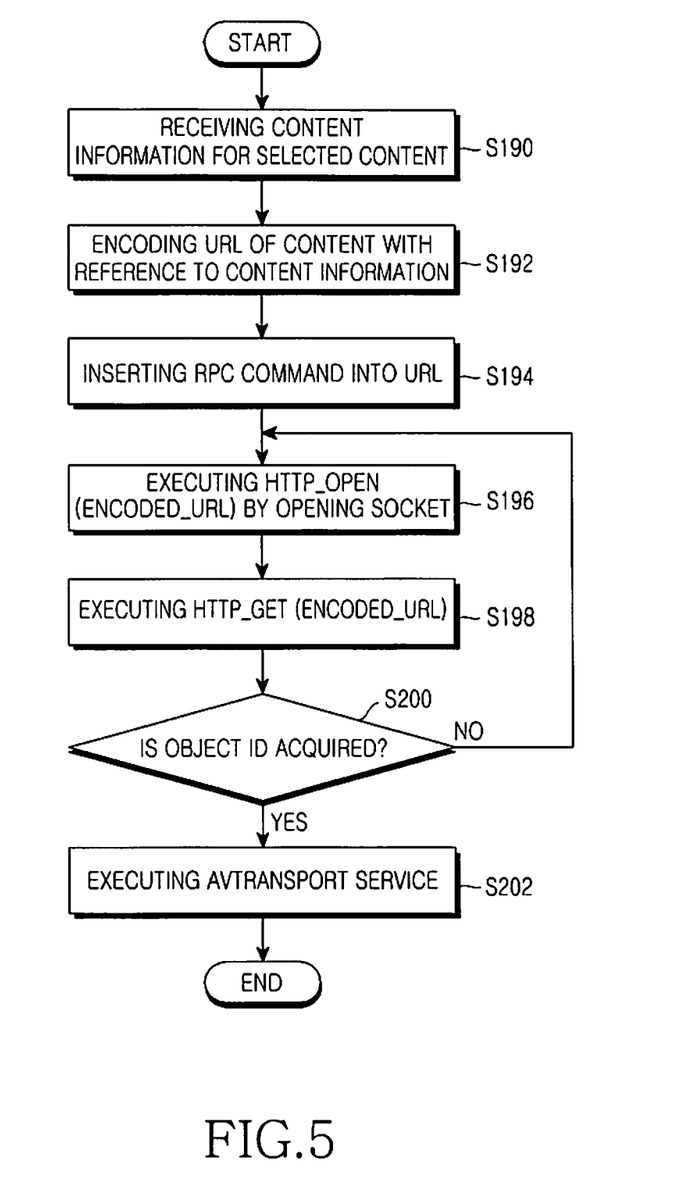
FIG. 5 illustrates an AVTransport service executing method of a file trans layer according to an embodiment of the present invention.

FIG. 5 illustrates an AV Transport service executing method of a file trans layer according to an embodiment of the present invention.

Referring to FIG. 5, the file trans layer 180 receives content information for a selected content item in step S190. The file trans layer 180 encodes a Uniform Resource Locator (URL) of the selected content item with reference to the content information in step S192. Encoding the URL of the selected content item includes encoding the content storing path to a format suitable for the renderer 130. The content storing path indicates where the content item selected by the user is located or stored.

In step S194, the file trans layer 180 inserts a Remote Procedure Call (RPC) command into the URL. In addition, the file trans layer 180 opens a socket and executes HTTP_Open (encoded URL) in step S196. Thereafter, the file trans layer 180 executes HTTP_GET (encoded URL) in step S198, and determines whether an ObjectID is acquired in step S200.

If an ObjectID is acquired in step S200, the file trans layer 180 executes an AVTransport service, i.e. a service that transmits and reproduces an audio or video in real time, in step S202. However, if an ObjectID is not acquired in step S200, the file trans layer 180 reopens the socket and reexecutes HTTP_OPEN in step S196, and reexecutes HTTP_GET in step S198.

HTTP_OPEN and HTTP_GET are general procedures for opening the socket for HTTP streaming. In addition, an ObjectID is a unique value for DLNA streaming, wherein if the ObjectID is added to an addresses of the add-in server 110, it is possible to produce unique addresses for individual content items.

Figure 6:
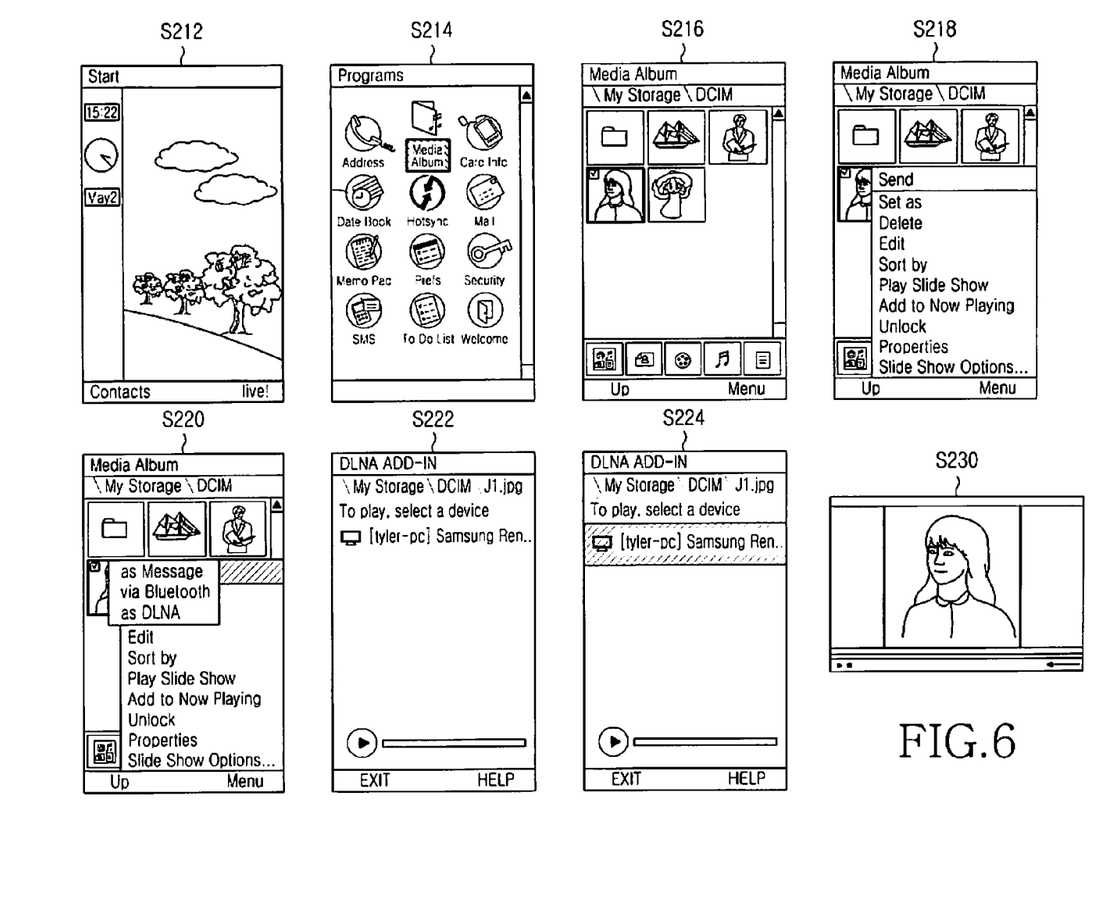
FIG. 6 illustrates a content providing service according to an embodiment of the present invention.

FIG. 6 illustrates a content providing service according an embodiment of the present invention. More specifically, FIG. 6 illustrates screen images S212-S224 displayed on a display of a mobile terminal and a screen image S230 displayed on a display of a selected renderer. GUIs of a media album are illustrated in screens S216-S220, and GUIs of the add-in controller 120 are illustrated in screens S222 and S224.

Referring to FIG. 6, from a basic screen S212 of the mobile terminal including the player 100, a user accesses the media album, which is a program associated with the DLNA system and corresponds to the player 100, by opening a menu including programs stored in the mobile terminal, as shown in screen S214. For example, when the mobile terminal is equipped with a touch screen display, the execution of the media album is performed by the user touching the "Media Album" icon as displayed on screen S214.

After opening the media album, the media album displays a content list for content items stored in the add-in server 110 associated with the media album and content items previously stored in the mobile terminal. In screen S216, the media album displays the content list by displaying an icon in a thumbnail form corresponding to each of the content items stored in the mobile terminal and the add-in server 110.

When a content item is selected, as illustrated in screen S216, a user then enters a command for processing the selected content item, as illustrated in screen S218. For example, as illustrated in screen S218, after selecting the specific content item, the user is presented with a drop down menu including different processing options, e.g., send, set as, delete, edit, etc.

In the example illustrated in FIG. 6, the user selects the "Send" from screen S218, wherein "Send" is a command for determining which program is employed to receive and execute the selected content item. Thereafter, in screen S220, the user is presented with options for sending the selected content item, e.g., "as Message," "via Bluetooth," or "as DLNA". Here, "as DLNA" is a command for instructing the media album that the DLNA system associated with the media album shall process the content. It is assumed that the media album displays the option of "as DLNA" only when the media album can process the content in association with the DLNA system.

If the user selects "as DLNA" from screen S220, the user is then presented with a list of available renderers 130, which are capable of reproducing the selected content item, as determined by the add-in controller 120, in screen S222. Thereafter, "[tyler-pc]Samsung Ren . . . ", which in this example, is the only available renderer 130, is selected by the user in screen S224.

Consequently, the selected renderer 130 (i.e. "[tyler-pc] Samsung Ren . . . ") reproduces the selected content item according to a content reproducing command from the add-in controller 120, as shown in screen S230. The screen S230 is an image on the display of the selected renderer 130 (e.g., a monitor of a personal computer (PC)).

Figure 7:
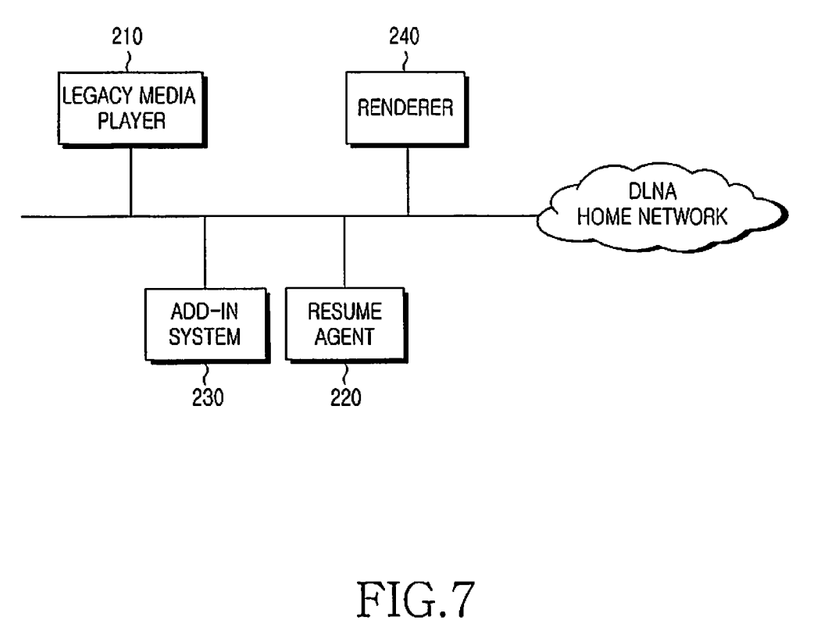
FIG. 7 is a block diagram illustrating a DLNA system according to an embodiment of the present invention.

FIG. 7 is a block diagram illustrating a DLNA system according to another embodiment of the present invention. The DLNA system has a construction similar to that of the DLNA system illustrated in FIG. 2, except that the add-in server and the add-in controller are integrated with each other in an add-in system 230, and a resume agent 220 is added. The resume agent 220 enables a user to resume a media file through a digital media renderer 240 when the user stops reproducing the media file (a content item) in a legacy media player 210.

More specifically, in the conventional DLNA system, there is a problem in that if a user performs switching for a media file from a legacy media player to a digital media renderer, or from one digital media renderer to another media renderer, it is impossible to merely resume reproduction of the media file, and the media file is reproduced from the beginning.

The present embodiment provides a system and method that enable resumption of the same media file through different media file reproducing devices.

Additionally, although the resume agent 220 is illustrated in FIG. 7 as being separate from the add-in system 230, the resume agent 220 may also be integrated with the add-in system 230. The resume agent 220 interacts with the legacy media player 210 and an add-in control point within the add-in system 230, and the resume agent 220 does not work by itself. The add-in control point corresponds to the add-in controller as illustrated in FIG. 2

Figure 8:
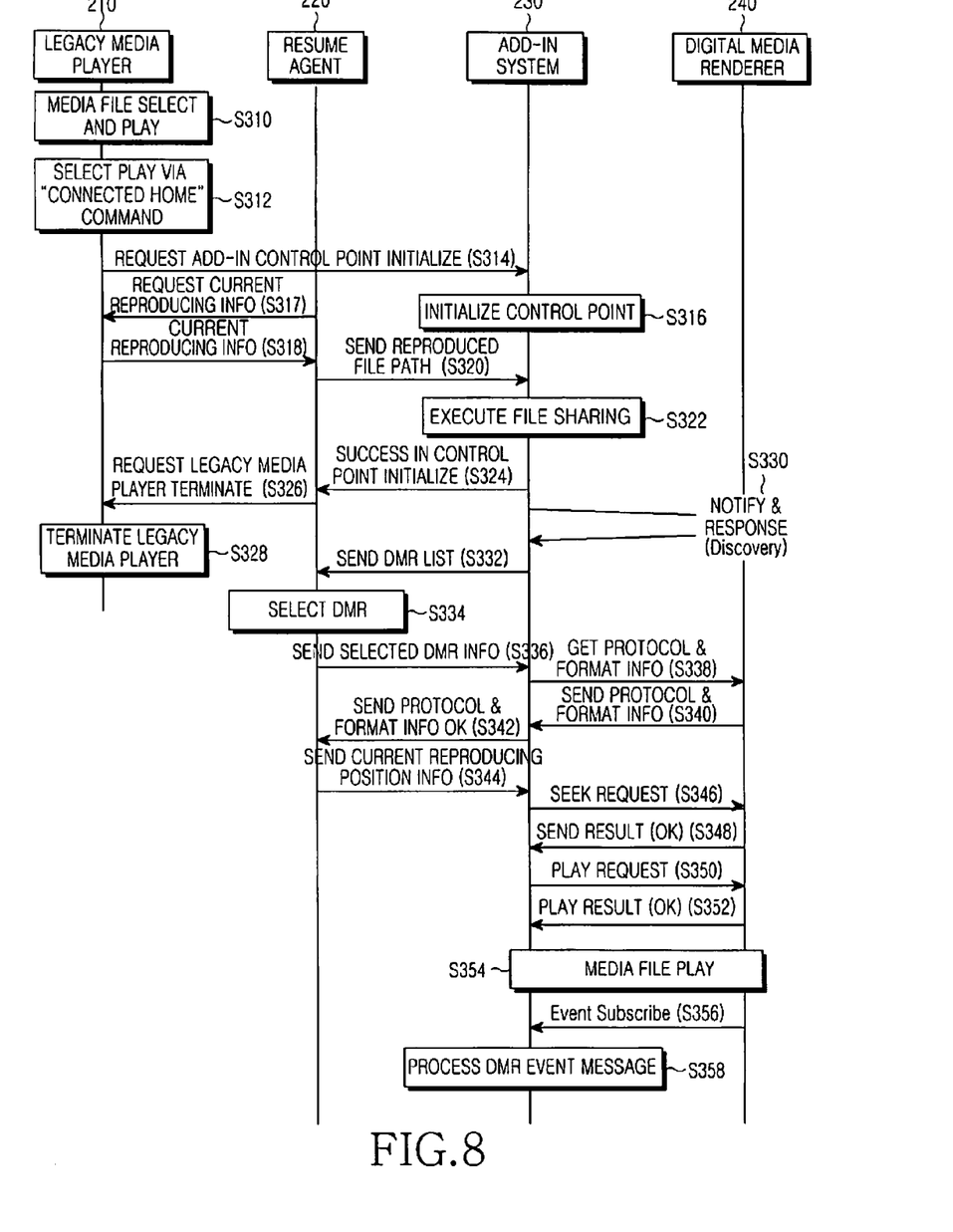
FIG. 8 is a flowchart illustrating a resume method of a media file using the DLNA system of FIG. 7, according to an embodiment of the present invention.
Figure 9:
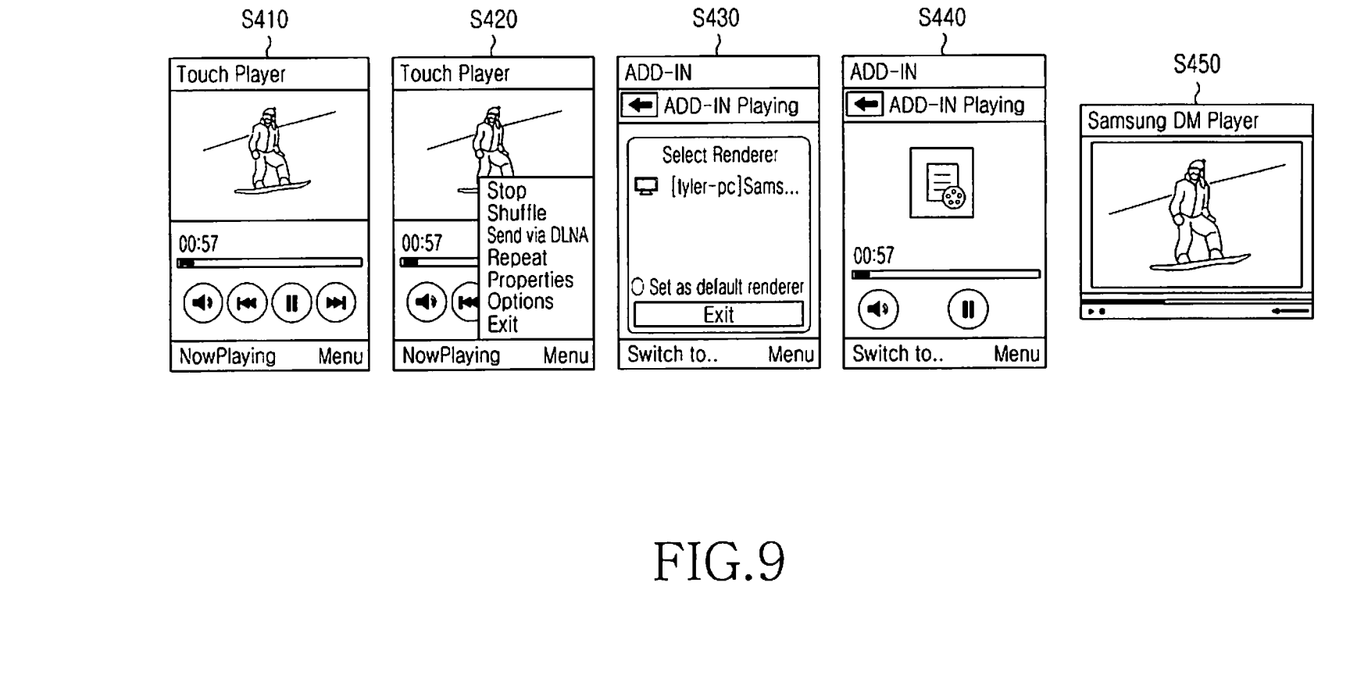
FIG. 9 illustrates GUIs for describing a resume method according to an embodiment of the present invention.

FIG. 8 is a flowchart illustrating a resume method of a media file using a DLNA system according to an embodiment of the present invention, and FIG. 9 illustrates GUIs for describing the resume method. More specifically, FIG. 9 illustrates screen images S410~S440 displayed on a display of a mobile terminal including the legacy media player 210 and a screen image S450 displayed on a display of the digital media renderer 240. GUIs of the legacy media player 210 are illustrated in screens S410 and S420, and GUIs of the add-in controller 120 are illustrated in screens S430 and S440.

As described above, a resume method enables a user to resume reproduction of a media file through a digital media renderer after initially reproducing a portion of the media file through a legacy media player.

Referring to FIG. 8, in step S310, the legacy media player 210 displays a media file list to a user, selects a media file from the list corresponding to a selection and reproducing command received from the user, and reproduces the selected media file. This is further illustrated in screen S410 of FIG. 9, wherein different GUIs, i.e., a media file window and a menu item, of the legacy media player are illustrated.

In step S312, the legacy media player 210 receives a resume command, i.e. a command "Play via Connected Home" from the user while reproducing the media file using the legacy media player 210. The command name, "Play via Connected Home" is just one example of a command, and may be changed to a command name such as "Send via DNLA," as illustrated in screen S420.

In step S314, the legacy media player 210 transmits an initialization request message to the add-in system. The initialization command is provided for the add-in control point within the add-in system 230, which corresponds to the add-in controller as illustrated in FIG. 2.

In step S316, the add-in system 230 initializes the add-in control point by loading a program for executing the resume function.

In step S317, the resume agent 220 requests the legacy media player 210 to send reproducing information of the media file, and in step S318, the resume agent 220 receives the reproducing information of the media file from the legacy media player 210. The reproducing information of the media file may include the file name including a reproduced file path, current reproducing time (or position), etc.

In step S320, the resume agent 220 transmits the reproduced file path information from among the acquired reproducing information to the add-in system 230.

In step S322, the add-in system 230 executes file sharing of the media file. Because the file sharing step S322 of the media file corresponds to steps S190 to S200, as described above with reference to FIG. 5, the detailed description thereof will be omitted here.

In step S324, after the file sharing is completed, the add-in system 230 transmits a message for notifying completion of the initialization of the add-in control point to the resume agent 220.

In step S326, the resume agent 220 transmits a termination request message to the legacy media player 210.

In step S328, the legacy media player 210 terminates its operation. In the step S328, the legacy media player 210 may operate in a background process, if the operation system supports multi-tasking.

In step S330, a discovery procedure through notifying and response is performed between the add-in system 230 and the digital media renderer 240, wherein the add-in system 230 acquires a renderer list of renderers that are capable of reproducing the media file through the discovery procedure. Although only one digital media renderer is illustrated in FIGS. 8 and 9, a plurality of digital media renderers may be connected to the DLNA home network.

In step S332, the add-in system 239 transmits the acquired renderer list to the resume agent 220. Due to the characteristic of the DLNA system, the step S332 may occur at any time after step S316, until the add-in system is terminated.

In step S334, the resume agent 220 displays the received renderer list to the user, and the user selects a preferable digital media renderer from the renderer list. Alternatively, the selection of a digital media renderer may be executed automatically. For example, the resume agent 220 may automatically select the digital media renderer that has been most recently selected by the user, or may automatically select a digital media renderer according to the user's default selection. This is further illustrated in screen S430 of FIG. 9, wherein a GUI for the add-in control point includes a renderer list window and a default selection item.

In step S336, the resume agent 220 transmits the selected digital media renderer information to the add-in system 230.

In step S338, the add-in system 230 sends a request for supported protocol and format information to the selected digital media renderer 240, and in step S340, the add-in system receives the protocol and format information supported by the selected digital media renderer 240.

In step S342, if the received protocol and format can be supported as is, the add-in system 230 notifies the resume agent 220 that the transmission of protocol and format information has been normally executed.

In step S344, the resume agent 220 transmits the current reproducing position information of the media file to the add-in system 230.

In step S346, the add-in system 230 transmits to the digital media renderer 240 a message requesting that a search be executed to a corresponding position according to the received current reproducing position. In step S348, the digital media renderer 240 notifies the add-in system 230 through a message that the search has been normally executed.

In step S350, the add-in system 230 sends a play request to the digital media renderer 240, requesting that the media file be reproduced at the searched position. In step S352, the digital media renderer 240 notifies the add-in system 230 that reproducing has been normally executed.

In step S354, the media file is concurrently reproduced in the add-in control point and in the digital media renderer 240. In the digital media renderer 240, the media file is actually reproduced, and in the add-in control point, only the reproducing information, such as reproducing position and reproducing time, is displayed. Referring to step S440 and step S450 in FIG. 9, it is shown that, in the digital media renderer 240, the media file is actually reproduced (in S450), and in the add-in control point, only the reproducing information is displayed (in S440).

In step S356, the digital media renderer 240 sends event registration information for transmitting the reproducing information of the media file to the add-in control point, and in step S358, the add-in control point displays the received reproducing information to the user.

Figure 10:
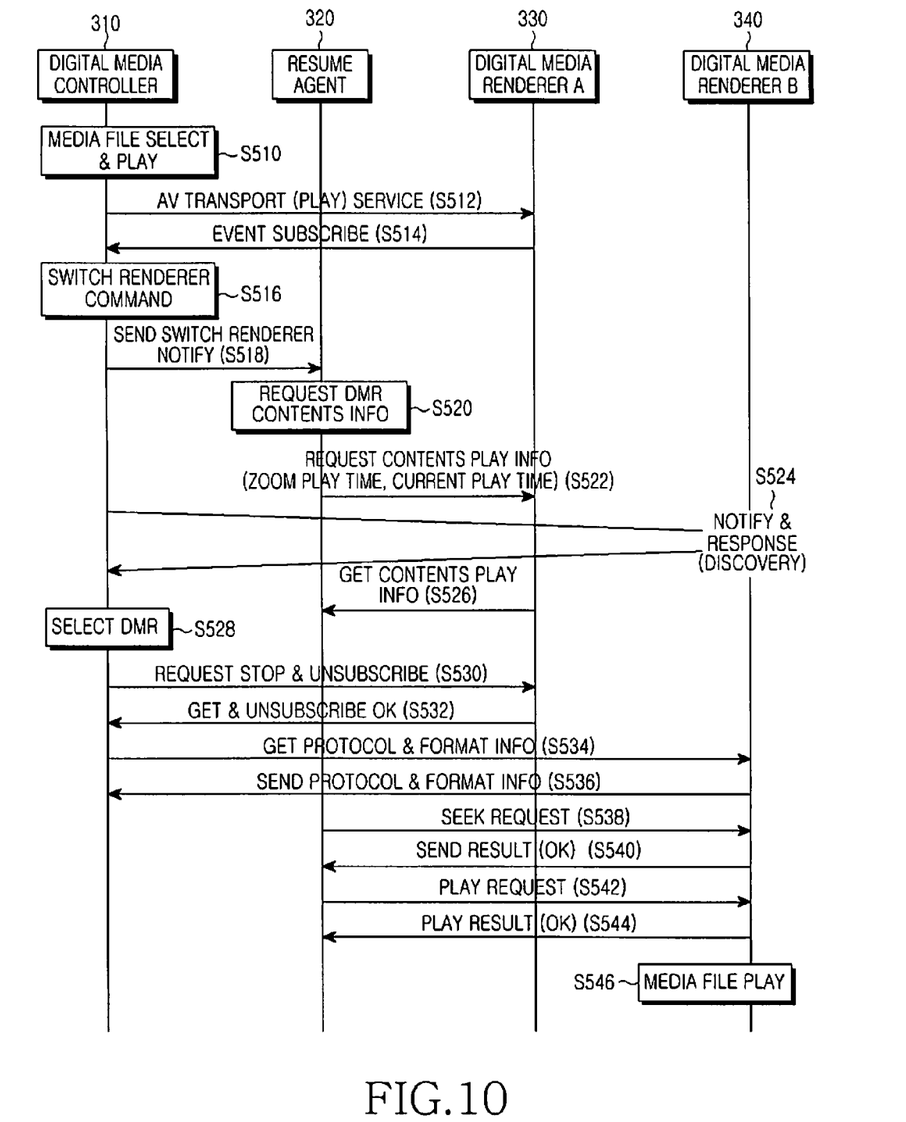
FIG. 10 is a flow chart illustrating a resume method of a media file using the DLNA system of FIG. 7, according to an embodiment of the present invention.

FIG. 10 is a flowchart illustrating a resume method of a media file using a DLNA system according to another embodiment of the present invention.

Referring to FIG. 10, in step S510, the digital media controller 310 receives a digital media selecting and reproducing command from the user.

In step S512, the digital media controller 310 provides an AV transport service, i.e., a service for reproducing the media file through the first digital media renderer 330, to the first digital media renderer 330 in response to the selecting and reproducing command. Because the AV transport service corresponds to the steps S152 to S158 described above with reference FIG. 3, a detailed description thereof will be omitted here.

In step S514, the first digital media renderer 330 sends an event registration message (Event Subscribe) for transferring the media file reproducing information to the digital media controller 310, and the digital media controller 310 displays the received reproducing information to the user.

In step S516, the digital media controller 310 receives a renderer switching command, i.e. a resume command for resuming from the first digital media renderer 330 to the second digital media renderer 340, from the user.

In step S518, the digital media controller 310 sends a renderer switching message corresponding to the resume command to the resume agent 320.

In step S520, the resume agent determines that reproducing information of the first digital media renderer is required, and in step S522, the resume agent 320 requests the first digital media renderer 330 to send the media file reproducing information. In step S526, the resume agent 320 receives the media file reproducing information from the first digital media renderer 330. The media file reproducing information includes the file name in which the reproduced file path is included, current reproducing time (or position), etc.

In step S524, a discovery procedure through notifying and response is performed between the digital media controller 310 and the second digital media renderer 340, and the digital media controller 310 acquires the renderer list of renders that are capable of reproducing the media file through the discovery procedure.

In step S528, the digital media controller 310 displays the received renderer list to the user, and the user selects a preferred digital media renderer from the list. Alternatively, the digital media renderer selection may be executed automatically. For example, the resume agent may automatically select the digital media renderer that the user has selected most recently, or may automatically select a digital media renderer according to the user's default selection.

In step S530, the digital media controller 310 sends a reproducing stop and registration cancel message to the first digital media renderer 330, and in step S532, the first digital media renderer 330 terminates its reproducing and event registration operation in response to the reproducing stop and registration cancel message, and at the same time, notifies the digital media controller 310 that the operation has been normally terminated.

In step S534, the digital media controller 310 requests the selected second digital media renderer 340 to send supported protocol and format information, and in step S546, the digital media controller 310 receives the protocol and format information supported by the second digital media renderer 340.

In step S538, the resume agent 320 sends a message to the second digital media renderer 340, requesting that a search be executed to a current position according to the received current reproducing position. In step S540, the second digital media renderer 340 notifies the resume agent 320 that the search has been normally executed.

In step S542, the resume agent 320 sends a message to the second digital media renderer 340, requesting that the media file be reproduced at the searched position. In step S544, in response to the reproducing request, the second digital media renderer 340 notifies the resume agent 320 through a message that the reproducing has been normally executed.

In step S546, the media file is reproduced in the second digital media renderer 340.

According to the present invention, there are provided a system and method of providing contents in a DLNA system, which can enhance a user's convenience in providing a rendering service.

According to the present invention, a DLNA system and a method for implementing resumption of the same media file through different medial reproducing devices therein are provided.

It is clear that the inventive method and system for providing contents in a DLNA system may be implemented in a form of hardware, software (i.e., a program) or a combination thereof. Such a program may be stored in a volatile or non-volatile recording medium readable by a machine, such as a computer, wherein such a recording medium may be a storage device, such as a Read Only Memory (ROM), a memory, such as a Random Access Memory (RAM), a memory chip or an integrated circuit, or an optical or magnetic recording medium, such as a Compact Disc (CD), a Digital Video Disc (DVD), a magnetic disc or a magnetic tape. That is, the inventive method and system for providing contents in a DLNA system may be embodied in the form of programs including codes for realizing the inventive method and system. Moreover, the programs can be electronically transferred through optional media like communication signals that are transmitted through wires or wirelessly.

While the present invention has been shown and described with reference to certain embodiments thereof, it is clear that the present invention is not limited to these embodiments. Furthermore, it will be obvious to those skilled in the art that various changes, modifications, variations, substitutions and equivalents in form and details may be made therein without departing from the spirit and scope of the present invention as defined by the appended claims.

What is claimed is:

1. A method for providing content in a Digital Living Network Alliance (DLNA) system including an add-in server and an add-in controller connected to a digital media player, the method comprising the steps of:
    displaying, through the digital media player, a content list including at least one video stored in the add-in server and at least one video stored in, and configured to be reproduced by, the digital media player;
    determining, by the digital media player, whether a video is configured to be reproduced by at least one registered digital media renderer, when the video is selected from the content list;
    transmitting a reproducing request for the selected video from the digital media player to the add-in controller, when the selected video is configured to be reproduced by the at least one registered digital media renderer;
    determining, by the add-in controller, one of the at least one registered digital media renderer that is capable of reproducing the video;
    transmitting a reproducing command for the selected video from the add-in controller to the add-in server or the one of the at least one registered digital media renderer; and
    reproducing, by the digital media player, the selected video when the selected video is not configured to be reproduced by the at least one registered digital media renderer,
    wherein the add-in server codes the selected video in a format to which the one of the at least one digital media renderer is adapted, and transmits the coded video to the one of the at least one digital media renderer, and
    wherein the add-in controller displays a reproducing position and a reproducing time of the selected video without displaying the selected video while the selected video is displayed by the one of the at least one registered digital media renderer.

2. The method of claim 1, wherein displaying the content list comprises:
    receiving, by the digital media player, content information for the at least one video stored in the add-in server or stored in the digital media player; and
    producing and displaying the content list using the content information.

3. The method of claim 2, wherein the content information includes file names and storage paths for individual videos stored in the add-in server or in the digital media player.

4. The method of claim 3, wherein transmitting the reproducing request for the selected video from the digital media player to the add-in controller comprises transmitting the content information for the selected video from the digital media player to the add-in controller.

5. A Digital Living Network Alliance (DLNA) system comprising:
    an add-in server for storing videos;
    a digital media player for displaying a content list including at least one video stored in the add-in server and at least one video stored in, and configured to be reproduced by, the digital media player, for determining whether a video is configured to be reproduced by at least one registered digital media renderer, when the video is selected from the content list, for transmitting a reproducing request for the selected video, when the selected video is configured to be reproduced by the at least one registered digital media renderer, and for reproducing the selected video when the selected video is not configured to be reproduced by the at least one registered digital media renderer; and
    an add-in controller for receiving the reproducing request from the digital media player, for determining one of the at least one registered digital media renderer that is capable of reproducing the video, and for controlling the one of the at least one registered digital media renderer to reproduce the selected video,
    wherein the add-in server codes the selected video in a format to which the one of the at least one digital media renderer is adapted, and transmits the coded video to the one of the at least one digital media renderer, and
    wherein the add-in controller displays a reproducing position and a reproducing time of the selected video without displaying the selected video while the selected video is displayed by the one of the at least one registered digital media renderer.

6. The system of claim 5, wherein the digital media player receives content information for the at least one video stored in the add-in server or stored in the digital media player, and produces and displays the content list using the content information.

7. The system of claim 6, wherein the content information comprises file names and storage paths for individual videos stored in the add-in server.

8. The system as claimed in claim 6, wherein the reproducing request for the selected video comprises the content information for the selected video.

9. A method of providing a media file by an add-in system in a Digital Living Network Alliance (DLNA) system including a digital media player and at least one digital media renderer connected to the add-in system, the method comprising the steps of:

receiving, by the add-in system, a resume request for resuming reproduction of the media file that was initially reproduced in the digital media player in the digital media renderer;

receiving, by the add-in system, reproducing information for the media file from the digital media player;

acquiring, by the add-in system, a renderer list of renderers that are capable of reproducing the media file;

transmitting, by the add-in system, the renderer list to a display, from which a preferred digital media renderer is selected from the renderer list;

transmitting the selected digital media renderer information to the add-in system;

requesting, by the add-in system, supported protocol and format information to the selected digital media renderer;

receiving, by the add-in system, the supported protocol and format information from the selected digital media renderer; and requesting, by the add-in system, the digital media renderer to search for a current reproducing position included in the reproducing information in the media file and reproduce the media file from the current reproducing position, wherein the add-in system codes the media file in a format to which the digital media renderer is adapted, and transmits the coded media file to the digital media renderer, and wherein the add-in system displays a reproducing position and a reproducing time of the media file without displaying the media file while the media file is displayed by the digital media renderer.

10. A method of providing a media file by a resume supporting system in a Digital Living Network Alliance (DLNA) system, the resume supporting system being connected to a plurality of digital media renderers, the method comprising the steps of:

receiving, by the resume supporting system, a resume request for resuming reproduction of the media file that was initially reproduced in a first digital media renderer in a second digital media renderer;

receiving, by the resume supporting system, reproducing information for the media file from the first digital media renderer;

sending, to the first digital media renderer, a reproducing stop message for terminating reproduction of the media file in the first digital media renderer;

transmitting, by an add-in system, a list for digital media renderers capable of reproducing the media file from among a plurality of digital media renderers, from which a preferred digital media renderer is selected from the renderer list;

transmitting, by the resume supporting system, the selected digital media renderer information to the add-in system; and requesting, by the resume supporting system, the second digital media renderer to search for a current reproducing position included in the reproducing information in the media file and to reproduce the media file from the current reproducing position, wherein the add-in system codes the media file in a format to which the second digital media renderer is adapted, and transmits the coded media file to the second digital media renderer, and wherein the add-in system displays a reproducing position and a reproducing time of the media file without displaying the media file while the media file is displayed by the second digital media renderer.

* * * * *